Aug. 23, 1960    R. W. TUTHILL    2,950,378
SLIDE CLOSURE FOR WELDING
Filed Dec. 22, 1958
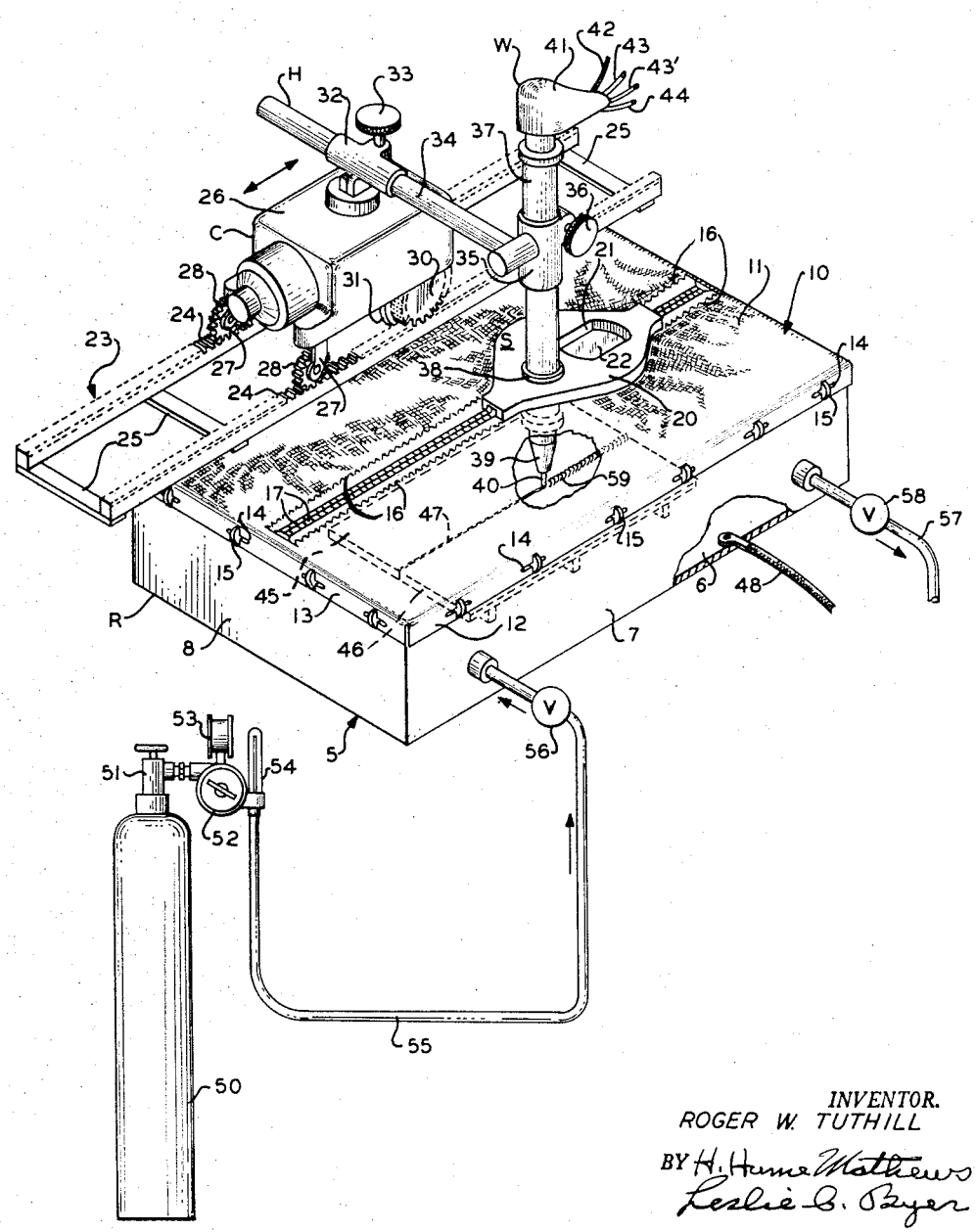
INVENTOR.
ROGER W. TUTHILL
BY H. Hume Mathews
Leslie B. Boyer
ATTORNEYS United States Patent Office 2,950,378
Patented Aug. 23, 1960

2,950,378

SLIDE CLOSURE FOR WELDING

Roger W. Tuthill, Mountainside, N.J., assignor to Air Reduction Company, Incorporated, New York, N.Y., a corporation of New York Filed Dec. 22, 1958, Ser. No. 782,205

5 Claims. (Cl. 219—74)

This invention relates to the art of welding and more particularly to improved welding equipment for use in gas shielded electric arc welding procedures.

As is well known in the arc welding art, the gas shielded arc welding process is one in which an arc is struck between the work parts and an electrode to generate the requisite welding heat while shielding the arcing terminal of the electrode, the arc, and the work parts acted on by the arc with a gas selected in accordance with the results desired to be accomplished. The process includes maintaining an envelope of shielding gas, usually helium, argon or mixtures thereof, in the region of the arc and the weld puddle to secure desired beneficial welding action. In the usual arrangement, the work parts, except at the welding zone, are exposed to the atmosphere and only the arc, the portion of the weld puddle and the areas of the work parts in the immediate vicinity of the arc are shielded by an envelope of the shielding gas which is generally transmitted through the welding gun.

Present day welding equipment and specific procedures are satisfactory for effecting sound welds in most metals. However, certain metals, such as titanium, zirconium and alloys thereof, present a special problem for the reason that they are not conducive to obtaining sound welds by the use of conventional equipment and procedures. These materials are more active to their surrounding than ordinary materials and require complete protection from the atmosphere during welding. For example, it is well known that these materials are extremely prone to embrittlement by oxygen, nitrogen and hydrogen and are highly reactive and combine readily at elevated temperatures with oxygen and nitrogen. These characteristics of such materials are important factors in welding and, as a consequence, it is essential that both the top and bottom faces of their weldments be effectively protected from contamination by the atmosphere in the course of welding the work parts. To accomplish this result it has heretofore been proposed to perform the welding operation on such materials in controlled atmosphere chambers which, due to their construction, are not only difficult to use but are expensive and cumbersome.

The primary object of this invention is to provide improved equipment for welding in a controlled atmosphere chamber.

Another object of this invention is to provide a novel arrangement of welding equipment for use in an arc welding procedure, the equipment comprising a chamber or receptacle for containing work parts in a desired gas environment, a slide fastener type closure for the receptacle including a slider movable along the path defined by the closure, a welding torch extending through the slider and into the receptacle and movable with the slider, and means movable with the slider for permitting observation of parts within the receptacle.

A further object of this invention is to provide welding equipment of the character indicated that is sturdy and durable in construction, that is reasonable in manufacturing, operating and maintenance costs, and that is capable of performing its intended functions in a satisfactory and trouble-free manner.

The enumerated objects and other objects, together with the advantages of this invention will be readily apparent to persons skilled in the art from the following detailed description of one embodiment thereof taken in conjunction with the annexed drawing which is an isometric view of an arrangement of apparatus embodying the invention, certain parts being broken away for better illustration of other parts.

Referring now to the drawing, I have illustrated therein a closed receptacle R which includes a rectangular, box-like metal container 5 which is open at the top. The container has a bottom wall 6, side walls 7 and end walls 8. The receptacle also includes a cover unit 10 which is made of an appropriate flexible sheet material 11 having side extensions 12 and end extensions 13 which respectively overlie the upper portions of sides 7 and ends 8 of the container. Sheet material 11 may consist of a fabric, such as canvas, which is impregnated or coated with a suitable composition to render the same substantially impervious to gases. Extensions 12 and 13 are provided with slots 14 for receiving fasteners or similar connectors 15. The cover unit is so constructed and arranged as to form a substantially fluid tight fit with container 5 but is detachable therefrom by opening fasteners 15.

The cover unit is provided with a pair of flexible stringers 16 which in the illustrated embodiment define a path intermediate and generally parallel to container side walls 7. Each stringer may be made of fabric and carries a plurality of links or scoops 17 of a slide fastener assembly. Successive links of each stringer are adapted to be coupled to or uncoupled from corresponding links of the other stringer through the medium of a duplex type slider S. The slider comprises a body 20 having an opening 21 which is provided with a window 22. The window is made of glass or other suitable transparent material to permit viewing parts within the receptacle from the exterior thereof. The illustrated arrangement of stringers 16, links 17 and slider S is similar in construction and operation to that disclosed in L. H. Morin Patent No. 2,344,049, granted March 14, 1944, for "Shuttle Slider," to which reference may be had for further details of its construction and operation. It is deemed sufficient, for the purposes of this application, to point out that slider S is movable along the stringers and coacts with the links of the stringers in a manner to maintain constant coupling engagement of the stringers while maintaining an opening of predetermined size and configuration within the confines of the slider body. Also, as the slider is moved in either direction along the stringers, it effects coupling at one end thereof of successive links of one stringer with corresponding links of the other stringer and simultaneous uncoupling at its other end of successive links of one stringer from corresponding links of the other stringer.

A track unit 23 is mounted above one side of the receptacle and consists of a pair of parallel rack type rails 24 and a plurality of transverse ties 25. The rails define a path which is substantially parallel to stringers 16. The track unit may be mounted directly on receptacle R or may be supported independently of the receptacle, as desired.

A travelling carriage C is supported by and movable along the track unit. The carriage includes a housing 26, a pair of front forks 27, each of which carries a pinion 28, and a pair of relatively large rear pinions 30. Pinions 28 and 30 mesh with corresponding rails 24, as shown. Rear pinions 30 are preferably provided with inner flanges 31 to prevent lateral displacement of the carriage relative to the track unit in use. The carriage may be propelled manually along the track unit or may be actuated by an adjustable speed electric motor enclosed within the housing 26 of carriage C and making a driving connection with pinion wheels 30.

Mounted on carriage C is a torch holder assembly H which will now be described. This assembly includes a first split tubular connector 32 having a knurled clamping screw 33, a rod 34 which extends through connector 32 and a second split tubular connector 35 which is secured to one end of rod 34 and is provided with a knurled clamping screw 36. Connector 32 is mounted on the top of carriage housing 26 and the parts of the holder assembly are so constructed and arranged as to permit of ready axial and angular adjustment of rod 34 and associated parts relative to connector 32.

The torch holder assembly supports a welding torch W which includes an outer cover tube 37 that extends through connector 35 and through an opening therefor in slider body 20. The torch cover tube is coupled to the slider body by a fitting 38. Tube 37 is provided, at its lower end, with a tapered nozzle 39 through which a welding electrode 40 extends and, at its upper end, with a connector head 41. Electrode 40 may be a consumable electrode or a non-consumable electrode, as desired. The head carries several elements of the welding torch including a welding cable 42, a conduit 43 for transmitting a liquid coolant, such as water, into the torch, a conduit 43' for withdrawing the coolant from the torch and a conduit 44 through which a shielded gas may be supplied for discharge through the torch nozzle 39 about the arcing terminal of the electrode 40 and the portions of the work parts made molten by the arc. This supply of shielding gas may or may not be used in view of the shielding gas supplied to the closed receptacle R and when used may be the same or different from that supplied to the receptacle R by means described below. The illustrated welding torch is similar to the one disclosed in N. E. Anderson and George R. Turbett Patent No. 2,512,705, granted June 27, 1950, for "Fluid-Cooled Gas-Blanketed Arc Welding Torch," to which reference may be had for further details of construction and operation.

The work parts, i.e., the pieces to be welded, are designated by numerals 45 and 46. These parts are positioned wholly within receptacle R and are in electrical contact with receptacle bottom wall 6. The work parts are arranged in edge abutting relation, as indicated by line 47. The line of abutment of the work parts is directly below and substantially parallel to the medial closure line defined by stringers 16 and links 17 of cover unit 10. Also, the line of abutment of the work parts is directly beneath and adjacent to the free end of electrode 40. A work lead cable 48 is connected to receptacle bottom wall 6 and makes electrical contact therewith.

A cylinder 50 contains a supply of high pressure shielding gas suitable for use in a desired gas shielded arc welding procedure. The gas may consist of helium, argon, mixtures thereof or any other gas that would be suitable as a protective shield for the work parts to be welded. Cylinder 50 is equipped with a discharge valve 51 which is connected to a pressure regulating valve 52, a pressure gauge 53 and a flowmeter 54, as shown. A conduit 55 establishes communication between the downstream side of valve 52 and the interior of receptacle R. Interposed in conduit 55 is a control valve 56. A second conduit 57 establishes communication between the interior of the receptacle and the atmosphere. This conduit is provided with an exhaust valve 58.

For the purpose of outlining the operation of the illustrated form of the invention, it is assumed that the apparatus is assembled and that the parts are in the relative positions shown in the drawing with valves 51, 52, 56 and 58 closed. Valve 51 is opened. The interior of receptacle R is then purged of air by opening valves 56 and 58 and by adjusting valve 52 to transmit shielding gas from cylinder 50 at a pressure and in an amount sufficient to displace and exhaust the air in the receptacle through conduit 57. When the receptacle is purged of air, exhaust valve 58 is closed. Throughout the welding procedure, sufficient shielding gas is transmitted into the receptacle by way of conduit 55 at a pressure slightly above atmospheric pressure whereby any and all leakage will consist of the escape of the shielding gas from the interior to the exterior of the receptacle instead of entrance of air from the atmosphere into the interior of the receptacle. In other words, the parts within the receptacle are maintained in desired gas shielding environment.

As soon as the receptacle has been purged of air, welding may be initiated by striking an electric arc between electrode 40 and work parts 45 and 46 in the usual manner. The operator observes the formation of increments of weldment 59 through window 22. It will be apparent from an examination of the drawing that the parts are so constructed and arranged as to effect welding of the work parts along abutment line 47 while maintaining an adequate gas shield within the receptacle.

It is obvious that my invention is not limited to arrangements in which the work parts are completely enclosed in a receptacle as above described since the receptacle may be modified to enclose only a portion of the work parts on which the welding operation is to be performed.

From the foregoing, it is believed that the objects, advantages, construction and utility of my present invention will be readily comprehended by persons skilled in the art, without further description. Although the invention has been herein shown and described in a simple and practicable form, it is recognized that certain parts or elements herein are representative of other parts or elements that may be used in substantially the same manner to accomplish substantially the same results. Therefore, it is to be understood that the invention is not to be limited to the exact details described herein, but is to be accorded the full scope and protection of the appended claims.

I claim:

1. In welding equipment, a receptacle adapted to enclose work parts to be welded, said receptacle having an opening therein and a flexible cover unit closing said opening, slide fastener means carried by the cover unit and permitting access to the interior of the receptacle, said slide fastener means including a pair of flexible stringers, a plurality of separable links secured to each stringer and a slider constructed and arranged to effect coupling at one end thereof of successive links of one stringer with corresponding links of the other stringer and uncoupling at the other end thereof of successive links of one stringer from corresponding links of the other stringer in response to corresponding movement of the slider along the stringers, said slider including a body having a through opening, and a welding torch extending through said opening and coupled with the slider for movement therewith.

2. In welding equipment, a receptacle adapted to enclose work parts to be welded, said receptacle having an opening therein and a flexible cover unit closing said opening, slide fastener means carried by the cover unit and permitting access to the interior of the receptacle, said slide fastener means including a pair of flexible stringers, a plurality of separable links secured to each stringer and a slider constructed and arranged to effect coupling at one end thereof of successive links of one stringer with corresponding links of the other stringer and uncoupling at the other end thereof of successive links of one stringer from corresponding links of the other stringer in response to corresponding movement of the slider along the stringers, said slider including a body having a through opening, a welding torch extending through said opening and coupled with the slider for movement therein, one end of the torch being disposed within the receptacle and adapted to be positioned adjacent the work parts, said torch including a welding electrode which projects through and beyond said one end of the torch, and a transparent window carried by the slider body to permit viewing of said one end of the torch and portions of the electrode and work parts from the exterior of the receptacle.

3. Welding equipment according to claim 2 including means movable along a path that is substantially parallel to the path defined by the stringers, said welding torch being secured to and movable with the last-mentioned means.

4. Welding equipment according to claim 2 including means for transmitting a shielding gas into the receptacle and maintaining said gas in the receptacle at a pressure above atmospheric pressure.

5. Welding equipment according to claim 2 including means for detachably securing said cover unit to said receptacle across the opening therein.

References Cited in the file of this patent

UNITED STATES PATENTS

| | | |
|---|---|---|
| 2,344,049 | Morin | Mar. 14, 1944 |
| 2,796,510 | Herbert | June 18, 1957 |
| 2,866,078 | Ballentine et al. | Dec. 23, 1958 |